(12) United States Patent
Cheng

(10) Patent No.: US 9,304,686 B2
(45) Date of Patent: Apr. 5, 2016

(54) DATA STORAGE DEVICE AND DATA TRIMMING METHOD

(75) Inventor: Chang-Kai Cheng, Hsinchu (TW)

(73) Assignee: SILICON MOTION, INC., Jhubei, Hsinchu County (TW)

(*) Notice: Subject to any disclaimer, the term of this patent is extended or adjusted under 35 U.S.C. 154(b) by 466 days.

(21) Appl. No.: 13/588,598

(22) Filed: Aug. 17, 2012

(65) Prior Publication Data
US 2013/0339575 A1      Dec. 19, 2013

(30) Foreign Application Priority Data

Jun. 13, 2012   (TW) .............................. 101121064 A

(51) Int. Cl.
*G06F 12/00*      (2006.01)
*G06F 3/06*       (2006.01)
(52) U.S. Cl.
CPC .............. *G06F 3/0608* (2013.01); *G06F 3/064* (2013.01); *G06F 3/0679* (2013.01)
(58) Field of Classification Search
None
See application file for complete search history.

(56) References Cited

U.S. PATENT DOCUMENTS

| 2011/0314204 | A1* | 12/2011 | Ootsuka et al. | 711/103 |
| 2012/0110243 | A1* | 5/2012 | Yeh | 711/103 |
| 2012/0110249 | A1* | 5/2012 | Jeong et al. | 711/103 |
| 2012/0221776 | A1* | 8/2012 | Yoshihashi et al. | 711/103 |
| 2013/0232290 | A1* | 9/2013 | Ish et al. | 711/103 |
| 2013/0246732 | A1* | 9/2013 | Seng et al. | 711/203 |
| 2013/0275660 | A1* | 10/2013 | Bennett | 711/103 |

FOREIGN PATENT DOCUMENTS

| TW | I230942 | 4/2005 |
| WO | WO 2011074712 A1 * | 6/2011 |

OTHER PUBLICATIONS

English language machine translation of TW I230942 (published Apr. 11, 2005).

* cited by examiner

*Primary Examiner* — Jared Rutz
*Assistant Examiner* — Brendan Lillis
(74) *Attorney, Agent, or Firm* — McClure, Qualey & Rodack, LLP

(57) ABSTRACT

A data storage device is disclosed. In one embodiment, the data storage device comprises a flash memory and a controller. The flash memory comprises a plurality of blocks, wherein each block comprises a plurality of pages, and each page comprises a plurality of data trimming units which is a smallest unit for data modification. After a data trimming process has been performed on an address range of the flash memory, the controller determines a last page corresponding to an ending address of the address range, determines whether data values stored in the last page with addresses subsequent to the ending address are all equal to a specific data pattern, and sets the value of a trimming flag corresponding to the last page to be 1 when the data values stored in the last page with addresses subsequent to the ending address are all equal to the specific data pattern.

18 Claims, 5 Drawing Sheets

DATA STORAGE DEVICE AND DATA TRIMMING METHOD

CROSS REFERENCE TO RELATED APPLICATIONS

This Application claims priority of Taiwan Patent Application No. 101121064, filed on Jun. 13, 2012, the entirety of which is incorporated by reference herein.

BACKGROUND OF THE INVENTION

1. Field of the Invention

The invention relates to flash memories, and more particularly to a data trimming method for flash memories.

2. Description of the Related Art

A flash memory is used in an electronic apparatus for data storage. The flash memory comprises a plurality of blocks for data storage. Because a flash memory can keep the data stored therein without power supply, and a portable electronic device has limited power, the flash memory is suitable for data storage for the portable electronic device.

Each block of a flash memory comprises a plurality of pages, and a controller manages the flash memory according to a unit of a page. Each page of the flash memory comprises a plurality of data trimming units, and the controller modifies data stored in the flash memory according to a unit of a data trimming unit. Referring to FIG. 1, a schematic diagram of a block 100 of a flash memory according to the invention is shown. The block 100 comprises a plurality of pages 101~10X, and each page comprises a plurality of data trimming units. For example, the third page 103 comprises data trimming units LBAi, LBAj, LBAk, . . . , and LBAm. In one embodiment, each page can store a data amount of 16 KB, and each data trimming unit can store a data amount of 512 KB. Thus, each page comprises 32 data trimming units.

When the controller directs the flash memory to perform a data trimming operation on an address range, the controller repeatedly writes a data bit 0 to the address range. After pages corresponding to the address range is written with the data bit 0, the controller must mark the pages as data trimmed pages for subsequent data management. A data storage device capable of marking the data trimmed pages from the flash memory is therefore required.

BRIEF SUMMARY OF THE INVENTION

The invention provides a data storage device. In one embodiment, the data storage device comprises a flash memory and a controller. The flash memory comprises a plurality of blocks, wherein each of the blocks comprises a plurality of pages, and each of the pages comprises a plurality of data trimming units which is a smallest unit for data modification. After a data trimming process has been performed on an address range of the flash memory, the controller determines a last page corresponding to an ending address of the address range, determines whether data values stored in the last page with addresses subsequent to the ending address are all equal to a specific data pattern, and sets the value of a trimming flag corresponding to the last page to be 1 when the data values stored in the last page with addresses subsequent to the ending address are all equal to the specific data pattern.

The invention provides a data trimming method. In one embodiment, a data storage device comprises a flash memory, the flash memory comprises a plurality of blocks, each of the blocks comprises a plurality of pages, and each of the pages comprises a plurality of data trimming units which is a smallest unit for data modification. First, after a data trimming process has been performed on an address range of the flash memory, a last page corresponding to an ending address of the address range is determined Whether data values stored in the last page with addresses subsequent to the ending address are all equal to a specific data pattern is then determined. When the data values stored in the last page with addresses subsequent to the ending address are all equal to the specific data pattern, the value of a trimming flag corresponding to the last page is set to be 1.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
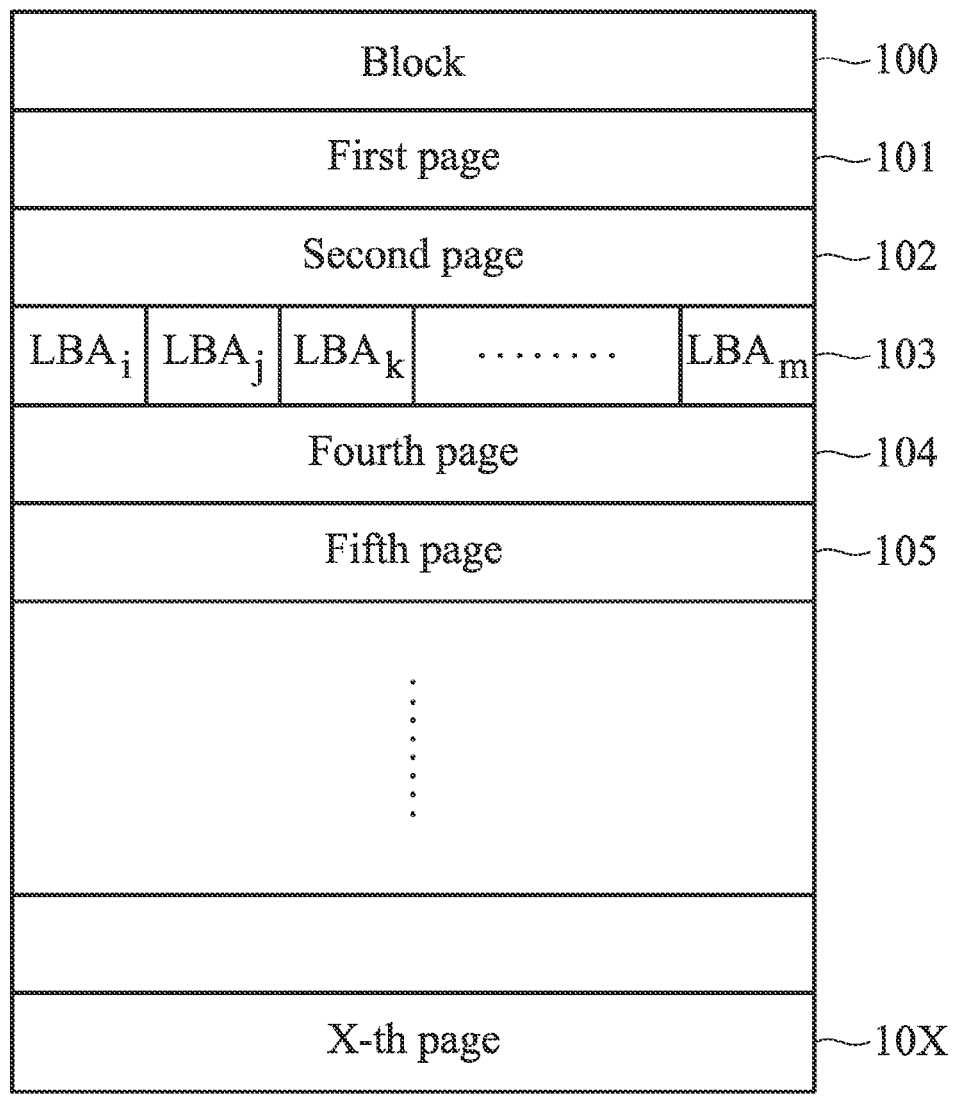
FIG. 1 is a schematic diagram of a block of a flash memory according to the invention.
Figure 2:
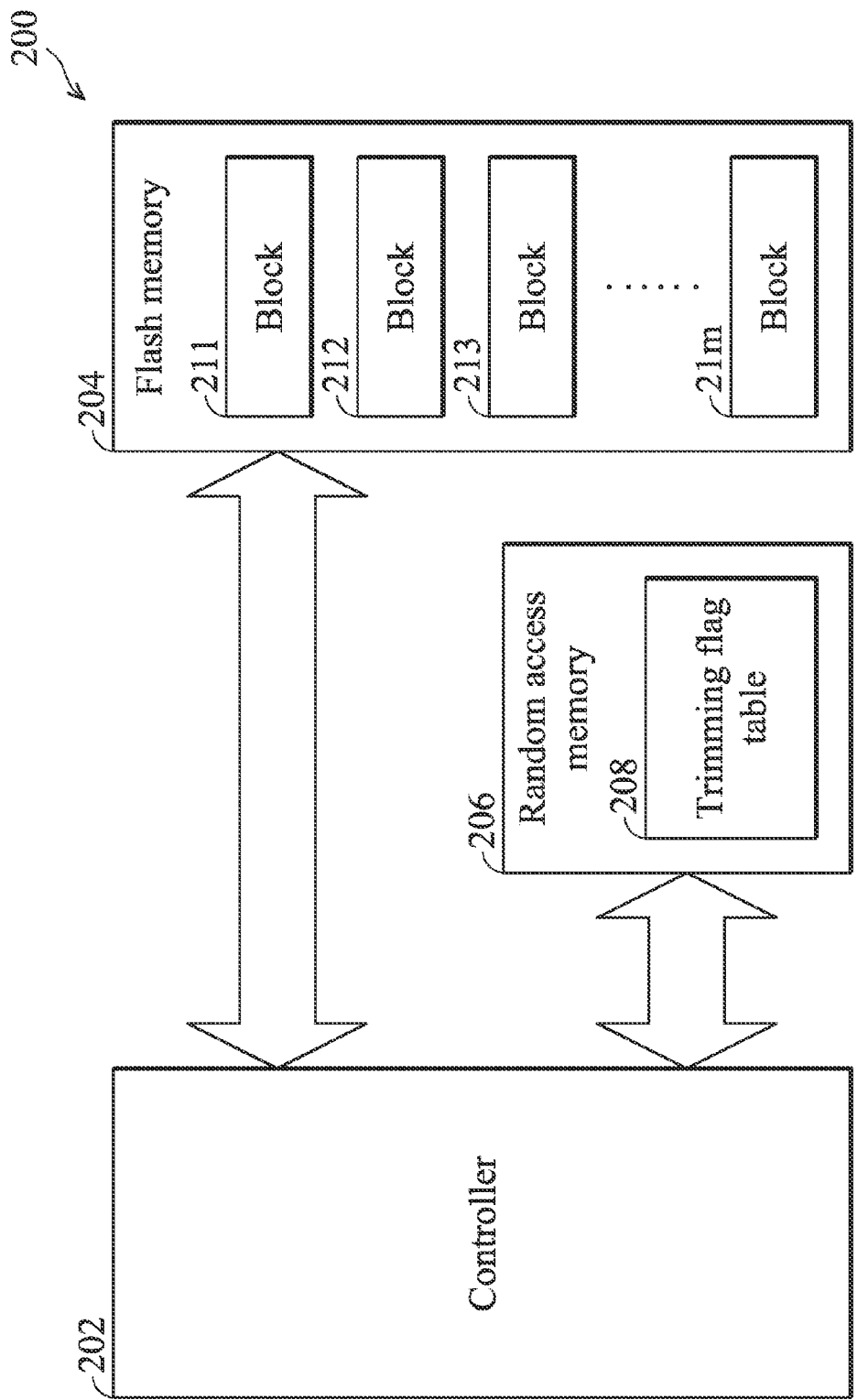
FIG. 2 is a block diagram of a data storage device according to the invention.

Referring to FIG. 2, a block diagram of a data storage device 200 according to the invention is shown. In one embodiment, the data storage device 200 comprises a controller 202, a flash memory 204, and a random access memory 206. The flash memory 204 comprises a plurality of blocks 211~21m for data storage. Each block 211~21m comprises a plurality of pages, and each page comprises a plurality of data trimming units. The data trimming unit is a smallest unit for data modification. In one embodiment, each page stores a data amount of 16 KB, and each data trimming unit stores a data amount of 512 KB. Thus, each page comprises 32 data trimming units.

In one embodiment, the controller 202 is coupled to a host, and accesses data from the flash memory 204 according to commands sent from the host. When the controller 202 performs a data trimming process on an address range of the flash memory 204, the controller 202 repeatedly writes a specific data pattern to the address range of the flash memory 204. In one embodiment, the specific data pattern has a value of 0x00. In another embodiment, the specific data pattern has a value of 0xFF. After the address range of the flash memory 204 is repeatedly written with the specific data pattern, the data trimming process is completed. The controller 202, however, must record the pages which have been written with the specific data pattern for data management.

In one embodiment, the random access memory 206 of the data storage device 200 stores a trimming flag table 208. The trimming flag table 208 records whether pages of the blocks 211~21m of the flash memory 204 have been written with the specific data pattern. In one embodiment, when all data stored in a specific page has a value of the bit 0, the controller 202 sets the value of the trimming flag corresponding to the specific page in the trimming flag table 208 to be 1. When some data stored in a specific page does not have a value of the bit 0, the controller 202 sets the value of the trimming flag corresponding to the specific page in the trimming flag table 208 to be 0. Thus, the controller 202 can record the pages on which a data trimming process has been performed as a reference for page management.

Figure 4:
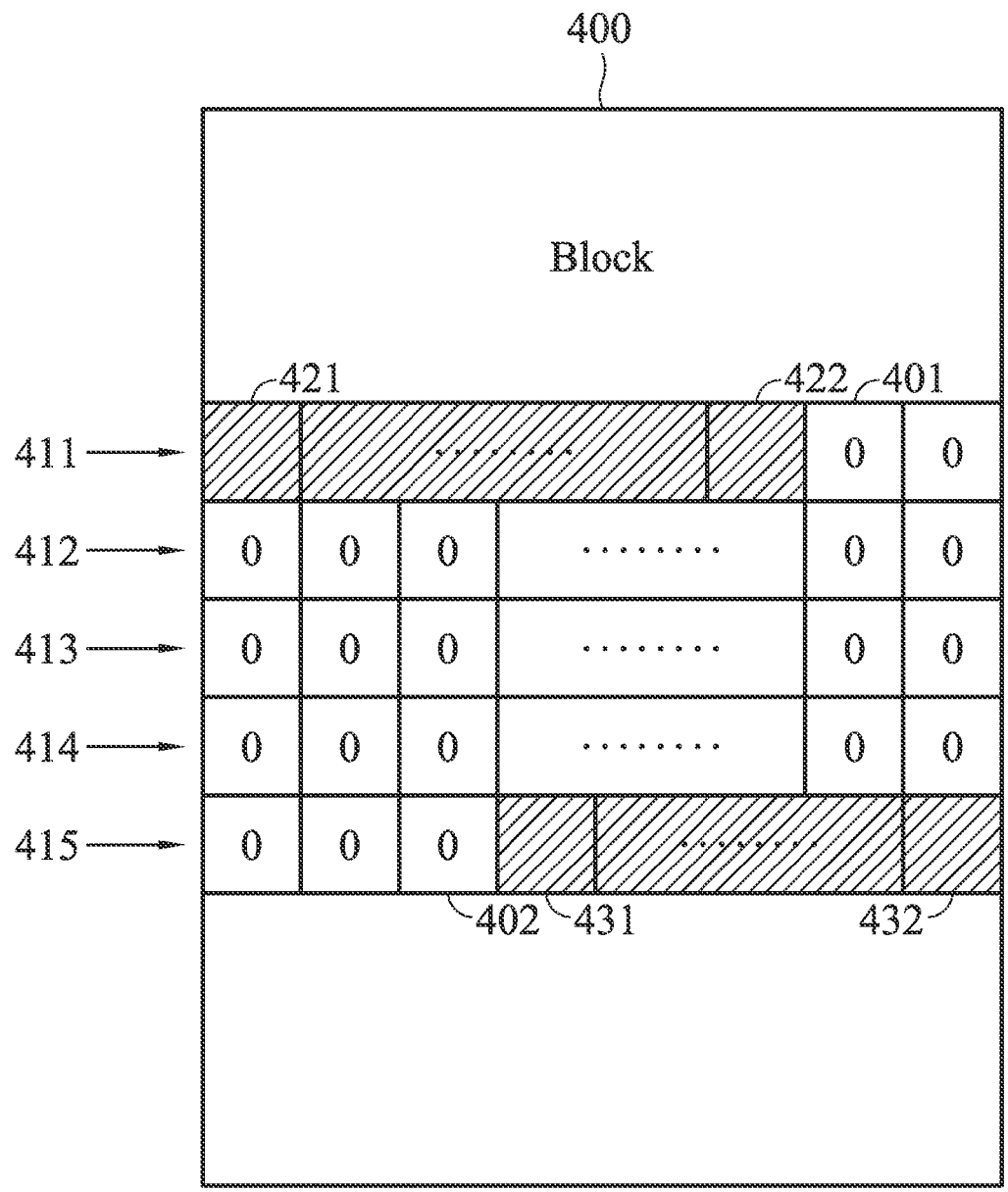
FIG. 4 is a schematic diagram of a plurality of pages corresponding to an address range on which a data trimming process has been performed according to the invention.

After the controller 202 performs a data trimming process on an address range of the flash memory 204, the controller 202 must set the values of the trimming flags corresponding to the address range. Referring to FIG. 4, a schematic diagram of a plurality of pages 411, 412, 413, 414, and 415 corresponding to an address range on which a data trimming process has been performed according to the invention is shown. Each of the pages 411~415 comprises a plurality of data trimming units. Assume that the address range on which a data trimming process has been performed starts from a starting address and ends on an ending address. The starting address corresponds to the data trimming unit 401 of the page 411, and the ending address corresponds to the data trimming unit 402 of the page 415. The data values stored in all data trimming units with addresses falling in the address range are then changed to the bit value 0, as shown in FIG. 4.

Because the address range corresponds to the pages 411, 412, 413, 414, and 415, and all data values stored in the middle pages 412, 413, and 414 are changed to be 0, the controller 202 must set values of the trimming flags corresponding to the middle pages 412, 413, and 414 to be 1. The data values stored in the first page 411 with addresses subsequent to the starting address of the address range are equal to 0. The controller 202 therefore reads the data values stored in the data trimming units 421~422 with addresses prior to the starting address from the first page 411, as shown in the shaded portion of the first page 411 of FIG. 4. If the data values stored in the data trimming units 421~422 with addresses prior to the starting address are all equal to 0, the controller 202 can then set the value of the trimming flag corresponding to the first page 411 in the trimming flag table 208 to be 1. Similarly, the data values stored in the last page 415 with addresses prior to the ending address of the address range are equal to 0. The controller 202 therefore reads the data values stored in the data trimming units 431~432 with addresses subsequent to the ending address from the last page 415, as shown in the shaded portion of the last page 415 of FIG. 4. If the data values stored in the data trimming units 431~432 with addresses subsequent to the ending address are all equal to 0, the controller 202 can then set the value of the trimming flag corresponding to the last page 415 in the trimming flag table 208 to be 1.

Figure 3A:
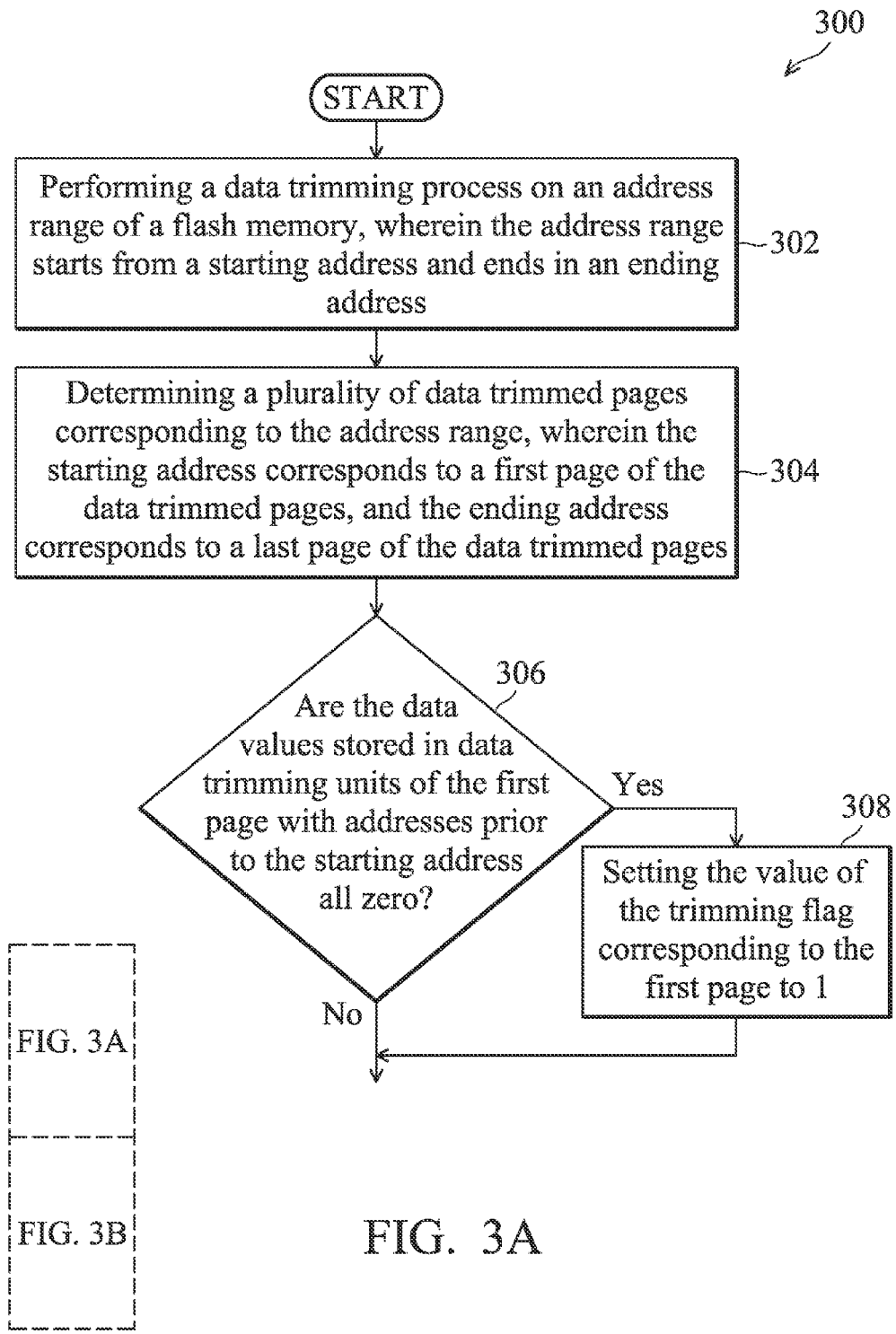
FIG. 3 is a flowchart of a data trimming method according to the invention.
Figure 3B:
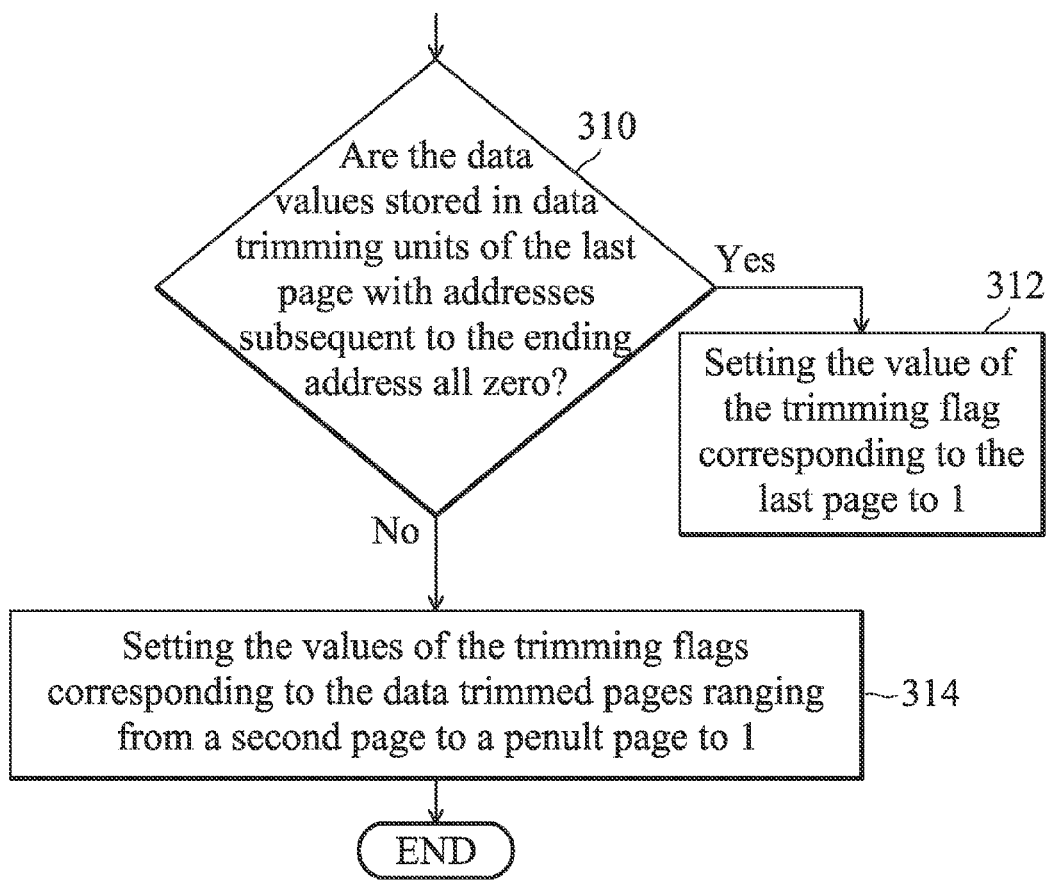

Referring to FIG. 3, a flowchart of a data trimming method 300 according to the invention is shown. First, the controller 202 performs a data trimming process on an address range of the flash memory 204 (step 302), wherein the address range starts from a starting address and ends in an ending address. The controller 202 then determines a plurality of data trimmed pages corresponding to the address range (step 304), wherein the starting address corresponds to a first page of the data trimmed pages, and the ending address corresponds to a last page of the data trimmed pages. For example, the page 411 shown in FIG. 4 is the first page comprising the data trimming unit 401 corresponding to the starting address, and the page 415 shown in FIG. 4 is the last page comprising the data trimming unit 402 corresponding to the ending address.

The controller 202 then determines whether the data values stored in data trimming units of the first page with addresses prior to the starting address are all zero (step 306). If the data values stored in data trimming units of the first page with addresses prior to the starting address are all zero, the controller 202 sets the value of the trimming flag corresponding to the first page to 1 (step 308). For example, if the controller 202 determines that the data values stored in the shaded region 421~422 of the first page 411 are all zero, the controller 202 sets the trimming flag corresponding to the first page 411 to be 1. The controller 202 then determines whether the data values stored in data trimming units of the last page with addresses subsequent to the ending address are all zero (step 310). If the data values stored in data trimming units of the last page with addresses subsequent to the ending address are all zero, the controller 202 sets the value of the trimming flag corresponding to the last page to 1 (step 312). For example, if the controller 202 determines that the data values stored in the shaded region 431~432 of the last page 415 are all zero, the controller 202 sets the trimming flag corresponding to the last page 415 to be 1. Finally, the controller 202 sets the values of the trimming flags corresponding to the data trimmed pages ranging from a second page to a penult page to 1 (step 314). For example, the controller 202 sets the values of the trimming flags corresponding to the middle pages 412, 413, and 414 to be 1. Thus, the controller 202 suitably records data value status corresponding to the pages on which a data trimming process has been performed as a reference for future data management.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
   a flash memory, comprising a plurality of blocks, wherein each of the blocks comprises a plurality of pages, and each of the pages comprises a plurality of data trimming units which is a smallest unit for data modification; and
   a controller, after a data trimming process has been performed on an address range of the flash memory, determining a last page corresponding to an ending address of the address range, determining whether data values stored in the last page with addresses subsequent to the ending address are all equal to a specific data pattern, and setting the value of a trimming flag corresponding to the last page to be 1 when the data values stored in the last page with addresses subsequent to the ending address are all equal to the specific data pattern, wherein the specific data pattern has a predetermined value.

2. The data storage device as claimed in claim 1, wherein after the data trimming process has been performed on the address range of the flash memory, the controller determines a first page corresponding to a starting address of the address range, determines whether data values stored in the first page with addresses prior to the starting address are all equal to the specific data pattern, and sets the value of a trimming flag corresponding to the first page to be 1 when the data values stored in the first page with addresses prior to the starting address are all equal to the specific data pattern.

3. The data storage device as claimed in claim 1, wherein the controller repeatedly writes the specific data pattern to the address range of the flash memory to perform the data trimming process on the address range of the flash memory.

4. The data storage device as claimed in claim 1, wherein the data storage device further comprises a random access memory for storing a trimming flag table which records a plurality of trimming flags corresponding to all pages of the flash memory.

5. The data storage device as claimed in claim 2, wherein after the data trimming process has been performed on the address range of the flash memory, the controller determines a plurality of data trimmed pages corresponding to the address range, and sets the values of the trimming flags corresponding to the data trimming pages except for the first page and the last page to 1.

6. The data storage device as claimed in claim 1, wherein the controller determines a plurality of first data trimming units with addresses subsequent to the ending address from the last page, and compares the data values stored in the first data trimming units with the specific data pattern to determine whether the data values stored in the last page with addresses subsequent to the ending address are all equal to the specific data pattern.

7. The data storage device as claimed in claim 2, wherein the controller determines a plurality of second data trimming units with addresses prior to the starting address from the first page, and compares the data values stored in the second data trimming units with the specific data pattern to determine whether the data values stored in the first page with addresses prior to the starting address are all equal to the specific data pattern.

8. The data storage device as claimed in claim 1, wherein the value of the specific data pattern is 0x00.

9. The data storage device as claimed in claim 1, wherein the value of the specific data pattern is 0xFF.

10. A data trimming method, wherein a data storage device comprises a flash memory, the flash memory comprises a plurality of blocks, each of the blocks comprises a plurality of pages, and each of the pages comprises a plurality of data trimming units which is a smallest unit for data modification, the data trimming method comprising:
    after a data trimming process has been performed on an address range of the flash memory, determining a last page corresponding to an ending address of the address range;
    determining whether data values stored in the last page with addresses subsequent to the ending address are all equal to a specific data pattern, wherein the specific data pattern has a predetermined value; and
    when the data values stored in the last page with addresses subsequent to the ending address are all equal to the specific data pattern, setting the value of a trimming flag corresponding to the last page to be 1.

11. The data trimming method as claimed in claim 10, further comprises:
    after the data trimming process has been performed on the address range of the flash memory, determining a first page corresponding to a starting address of the address range;
    determining whether data values stored in the first page with addresses prior to the starting address are all equal to the specific data pattern; and
    when the data values stored in the first page with addresses prior to the starting address are all equal to the specific data pattern, setting the value of a trimming flag corresponding to the first page to be 1.

12. The data trimming method as claimed in claim 10, wherein performing of the data trimming process on the address range comprises:
    repeatedly writing the specific data pattern to the address range of the flash memory.

13. The data trimming method as claimed in claim 10, wherein the data storage device further comprises a random access memory for storing a trimming flag table which records a plurality of trimming flags corresponding to all pages of the flash memory.

14. The data trimming method as claimed in claim 11, further comprises:
    after the data trimming process has been performed on the address range of the flash memory, determining a plurality of data trimmed pages corresponding to the address range; and
    setting the values of the trimming flags corresponding to the data trimming pages except for the first page and the last page to 1.

15. The data trimming method as claimed in claim 10, wherein the determination of whether the data values stored in the last page with addresses subsequent to the ending address are all equal to the specific data pattern comprises:
    determining a plurality of first data trimming units with addresses subsequent to the ending address from the last page; and
    comparing the data values stored in the first data trimming units with the specific data pattern to determine whether the data values stored in the last page with addresses subsequent to the ending address are all equal to the specific data pattern.

16. The data trimming method as claimed in claim 11, wherein the determination of whether the data values stored in the first page with addresses prior to the starting address are all equal to the specific data pattern comprises:
    determining a plurality of second data trimming units with addresses prior to the starting address from the first page; and
    comparing the data values stored in the second data trimming units with the specific data pattern to determine whether the data values stored in the first page with addresses prior to the starting address are all equal to the specific data pattern.

17. The data trimming method as claimed in claim 10, wherein the value of the specific data pattern is 0x00.

18. The data trimming method as claimed in claim 10, wherein the value of the specific data pattern is 0xFF.

* * * * *